INVENTORS
FRED P. MODROWSKY
HARRY G. ANASTASIA
BY Herbert L. Davis
ATTORNEY

INVENTORS
FRED P. MODROWSKY
HARRY G. ANASTASIA
BY Herbert L. Davis
ATTORNEY

INVENTORS
FRED P. MODROWSKY
HARRY G. ANASTASIA
BY Herbert L. Davis
ATTORNEY

Jan. 12, 1965  F. P. MODROWSKY ETAL  3,165,682
FLUID PRESSURE SENSING MECHANISM OPERATIVELY ARRANGED
TO COMPENSATE FOR CHANGING ENVIRONMENTAL CONDITIONS
Filed Feb. 27, 1961  5 Sheets-Sheet 4

INVENTORS
FRED P. MODROWSKY
HARRY G. ANASTASIA
BY Herbert L. Davis
ATTORNEY

INVENTORS
FRED P. MODROWSKY
HARRY G. ANASTASIA
BY Herbert L. Davis
ATTORNEY

United States Patent Office 3,165,682
Patented Jan. 12, 1965

3,165,682
FLUID PRESSURE SENSING MECHANISM OPERATIVELY ARRANGED TO COMPENSATE FOR CHANGING ENVIRONMENTAL CONDITIONS
Fred P. Modrowsky, Union, and Harry G. Anastasia, Paramus, N.J., assignors to The Bendix Corporation, Teterboro, N.J., a corporation of Delaware
Filed Feb. 27, 1961, Ser. No. 91,860
17 Claims. (Cl. 318—32)

The invention relates to a novel fluid pressure sensitive device for use in an aircraft or missile and more particularly to such a device in which the operating parts of the device are so arranged as to be relatively unaffected by changing environmental conditions such as the prevailing temperature and attitude of the craft in flight or accelerational forces applied thereto in the flight of the craft at subsonic and supersonic speeds.

An object of the invention therefore is to provide a fluid pressure sensing device which is relatively unaffected by changing environmental conditions such as temperature, attitude and acceleration.

Another object of the invention is to provide a fluid pressure transducer mechanism including a pair of diaphragm capsules, a rocking shaft, a differential gear assembly operatively connected to the shaft and an electrical take-off device driven by the differential gear assembly and mounted within a sealed chamber in which may be applied the fluid pressure to be sensed by the diaphragm capsules and in which the pressure sensitive diaphragm capsules are symmetrically positioned so that any linear motion at the free ends thereof will actuate the rocking shaft and differential gear assembly and in which there are provided temperature responsive elements to compensate the operating parts of the mechanism for variations in the environmental temperature including temperature responsive means for varying the operating position of the diaphragm capsules and other temperature responsive means for varying the operating range of the mechanism.

Another object of the invention is to provide a fluid pressure transducer mechanism in which the assembly of operating parts are symmetrically arranged so as to correct the mechanism for changes in the attitude thereof relative to the effective gravitational forces as well as correct the mechanism for changes in the accelerational forces which may be applied thereto under the extreme high speeds of flight of the aircraft or missile in which the device may be particularly designed for use.

Another object of the invention is to provide such a fluid pressure sensitive device in which motion of the two diaphragm capsules in response to the sensed fluid pressure are arranged to effect motion of a movable rotor core of an electrical pick-off device or differential transformer through a novel jewel mounted differential gear assembly so as to cause a displacement of the rotor core from an original null signal position to effect an electrical error signal which is in turn directed through a servo amplifier and applied to a servo motor to control the direction and speed of rotation of the servo motor so as to in turn drive through an output shaft the differential gear assembly to return the rotor core to its initial null signal position relative to the differential transformer and cause the servo motor to position the output shaft as a function of the magnitude of the fluid pressure applied within the chamber of the fluid pressure transducer mechanism.

Another object of the invention is to symmetrically arrange the diaphragm capsules of the aforenoted fluid pressure sensitive device about the movable rocking shaft so as to prevent the rotor core of the differential transformer from being adversely positioned by changes in the attitude of the device relative to the force of gravity or by accelerational forces applied thereto inasmuch as the effect of such forces thereon will be negligible due to the precise structure and arrangement of the diaphragm capsules, rocking shaft, differential gear assembly and electrical pick-off device operatively positioned through the differential gear assembly by the rocking shaft.

Another object of the invention is to provide in the aforenoted pressure sensitive device a novel arrangement of bimetal linkages and bimetal mounts for supporting a pair of symmetrically arranged diaphragm capsules cooperating so as to compensate for changing characteristics of the capsules and operating linkages under varying ambient temperature conditions and thereby render the disclosed mechanism immune to changes in the prevailing operating conditions such as ambient temperature.

Another object of the invention is to provide an absolute pressure sensitive device having extremely stable operating characteristics under varying environmental conditions such as ambient temperature, attitude and acceleration to which the device may be subjected during normal use in aircraft and outer space missiles.

Another object of the invention is to provide a fluid pressure sensing mechanism of the aforenoted type including a novel set of overtravel switches operatively controlled by the position of the rocking shaft of the diaphragm assembly relative to the position of the output shaft of the servo motor to provide a control for the servo motor to effect operation thereof in response to a relatively large displacement of the rocking shaft relative to the position of the servo motor output shaft reflecting in turn extreme pressure changes in the fluid pressure medium sensed by the diaphragm capsules mounted within the pressure chamber of the device.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
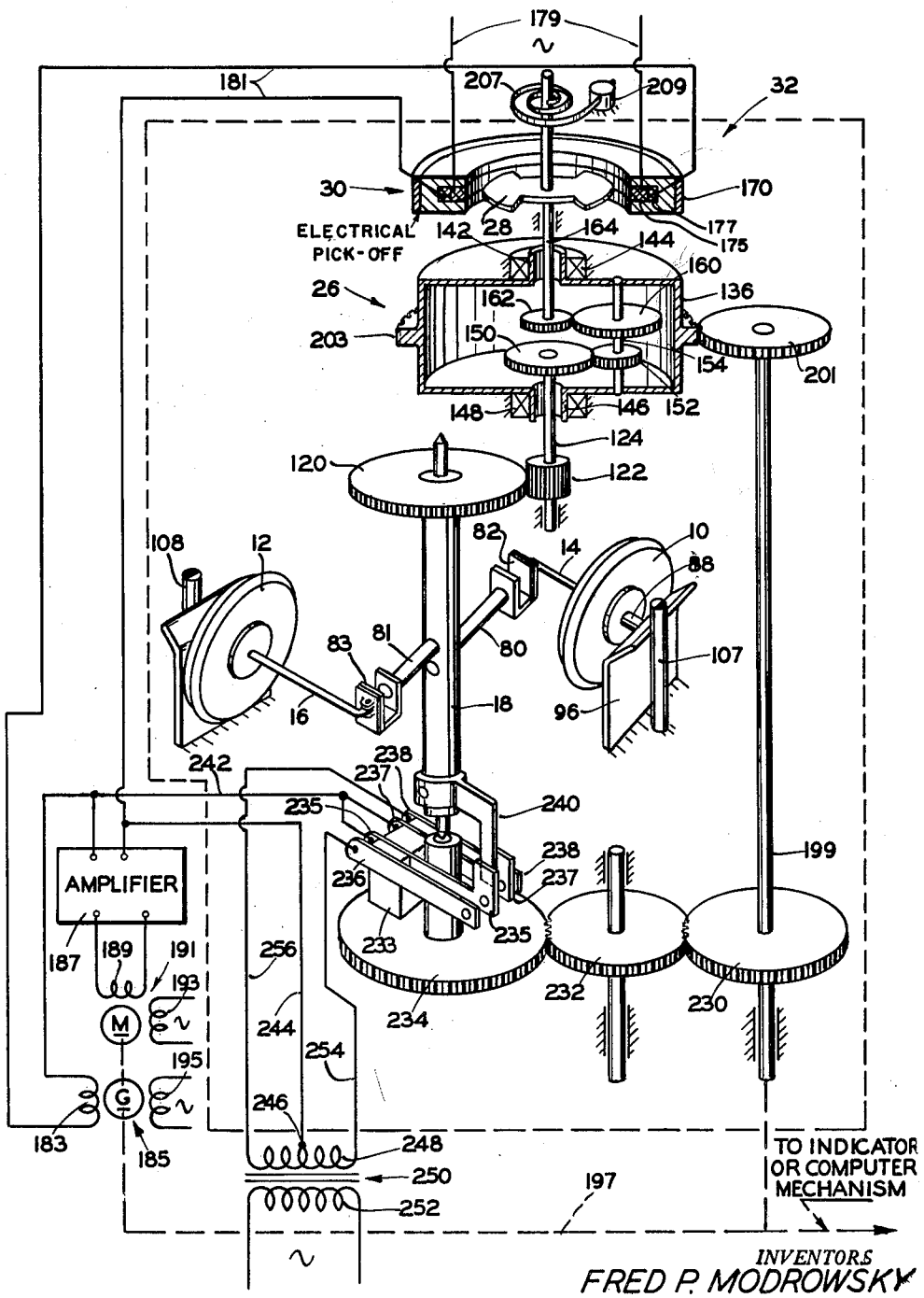
FIGURE 1 is a diagrammatic showing of the fluid pressure sensing mechanism showing the same in operative relation in a servo motor control circuit.
Figure 3:
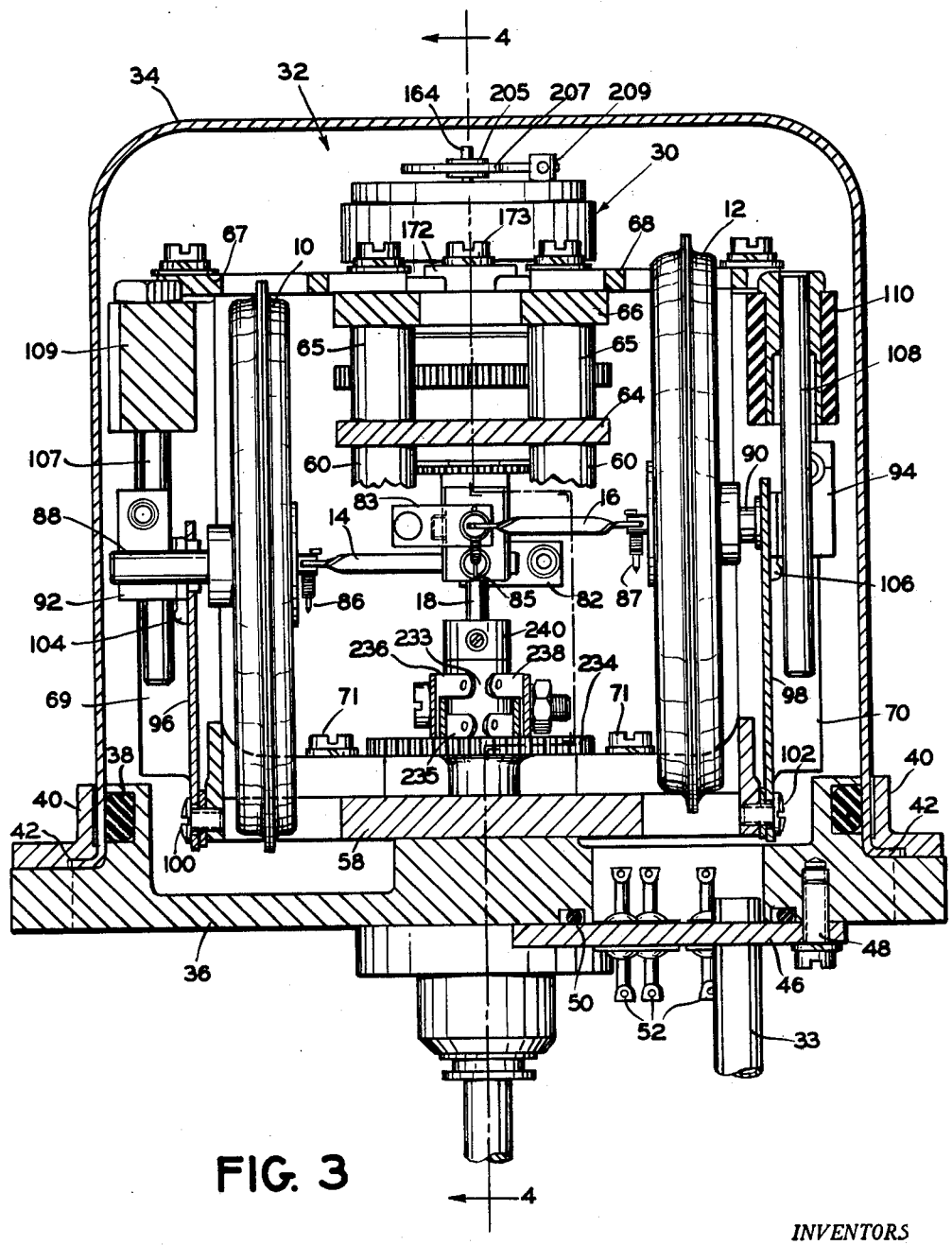
FIGURE 3 is a sectional view of FIGURE 2 taken along the lines 3—3 and looking in the direction of the arrows.
Figure 4:
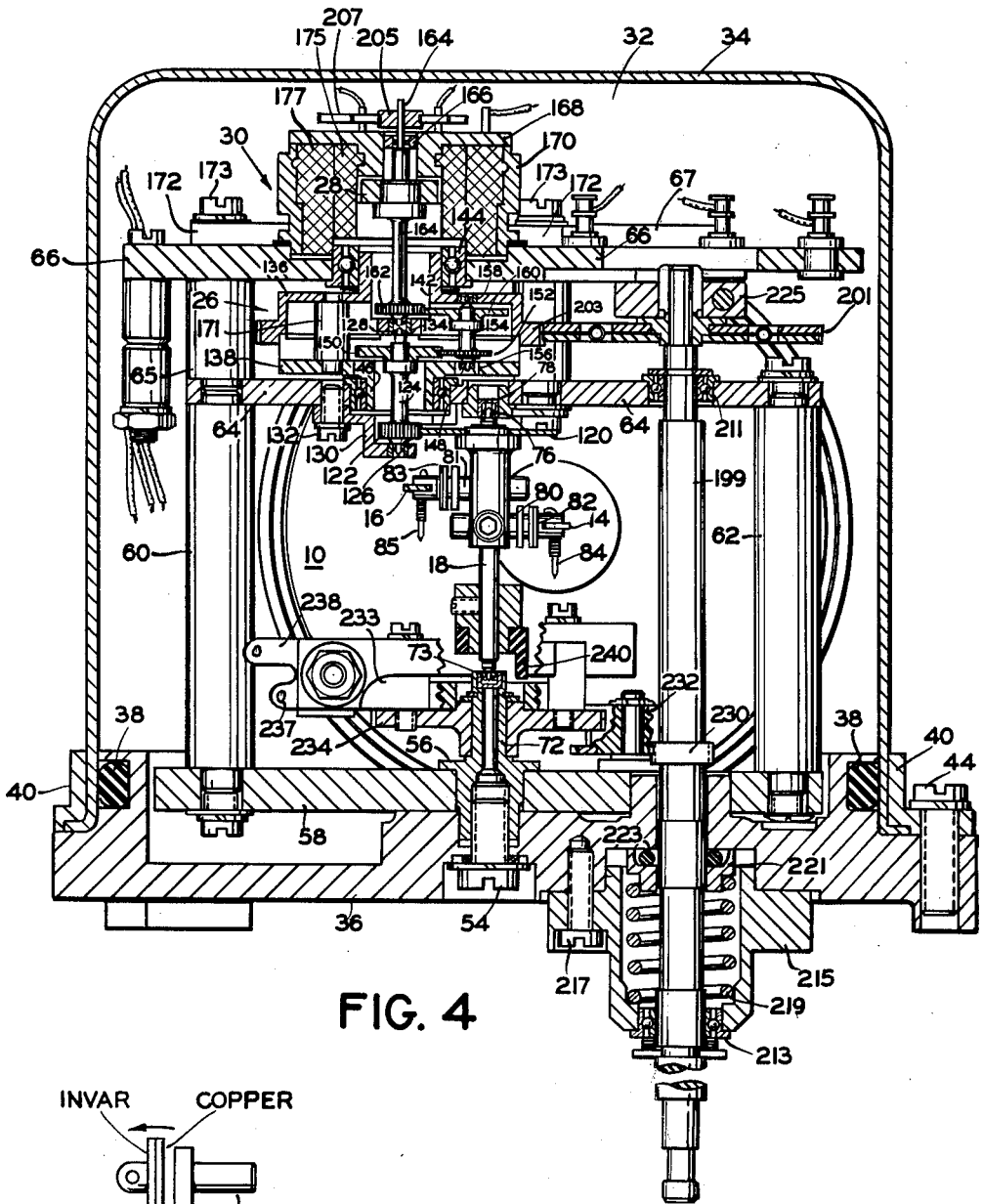

FIGURE 4 is a sectional view of FIGURE 3 taken along the lines 4—4 and looking in the direction of the arrows with certain parts broken away to better show the operating relationship of the differential gear assembly to the rocking shaft, differential transformer and follow-up shaft driven by a servo motor controlled by the differential transformer as well as showing the mounting of elements of the overtravel control switch illustrated diagrammatically in FIGURE 1.

Figure 5:
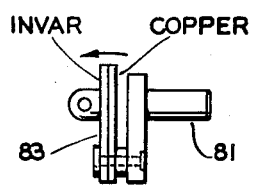

FIGURE 5 is an enlarged top view of one of the bimetal linkages shown in FIGURE 4 in which the other bimetal linkage is of a like construction. In FIGURE 5 there is indicated by an arrow a deflection of the bimetal element in an outward sense away from the operating arm upon an increase in the ambient temperature, while the bimetal element is deflected in an opposite inward sense toward the operating arm upon a decrease in the ambient temperature.

Figure 6:
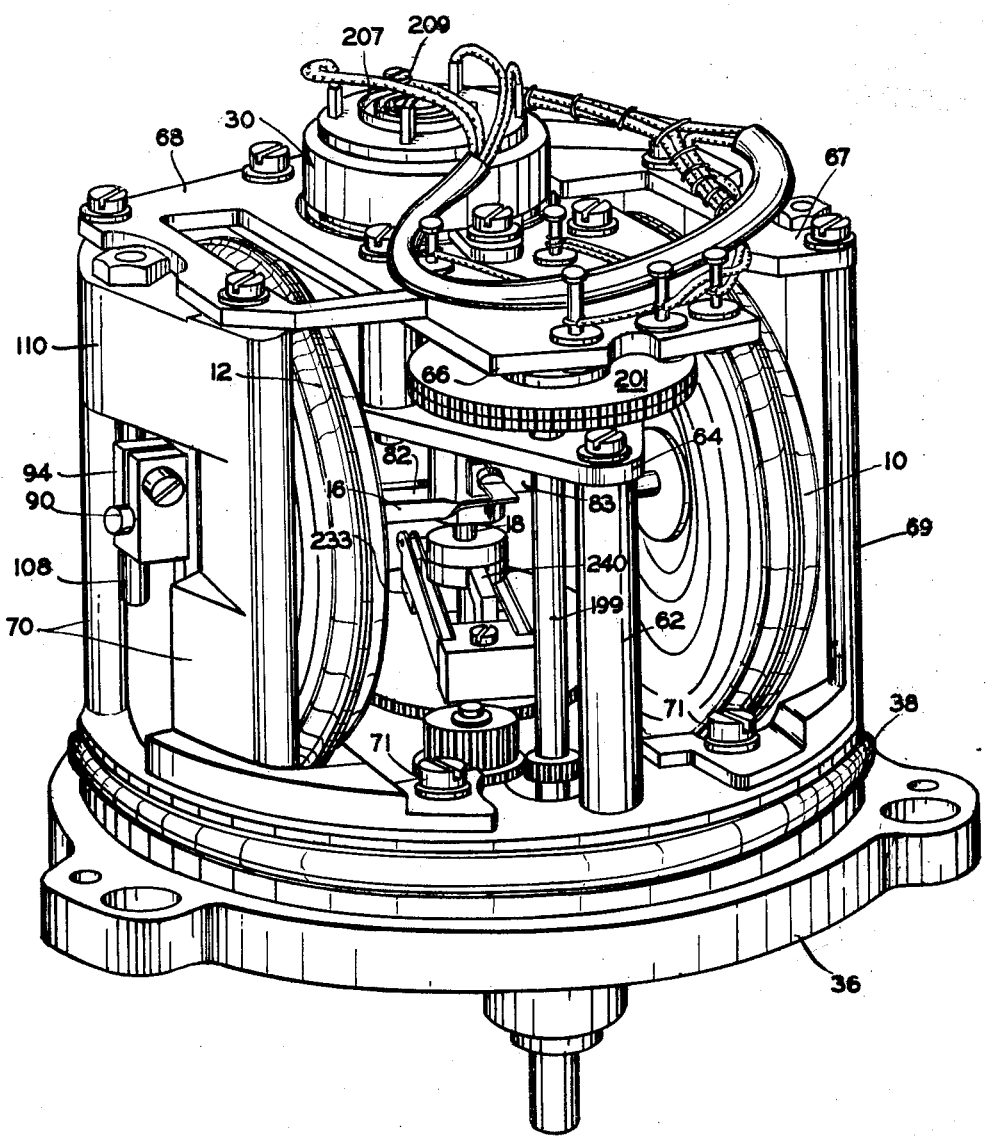

FIGURE 6 is a perspective view of the fluid pressure sensing mechanism with the cover cap removed.

Referring to the drawings of FIGURES 1-4, the fluid pressure sensing mechanism is shown as including a pair of diaphragm capsules 10 and 12 operatively connected by linkages 14 and 16 to a rocking shaft 18 rotatably mounted at opposite ends in jeweled bearings and drivingly connected through suitable gearing to one element of a differential gear assembly 26 and therethrough to a rotor core element 28 of an electrical pick-off device or differential transformer 30.

The aforenoted elements are mounted within an air tight chamber indicated by numeral 32 and shown in FIGURES 3 and 4. The air tight chamber 32 has a fluid pressure medium applied therein through a pressure conduit or tube 33 opening into the chamber 32 and leading from a source of fluid pressure medium such as ambient atmospheric pressure or altitude pressure or other fluid pressure medium to be sensed therein.

Figure 2:
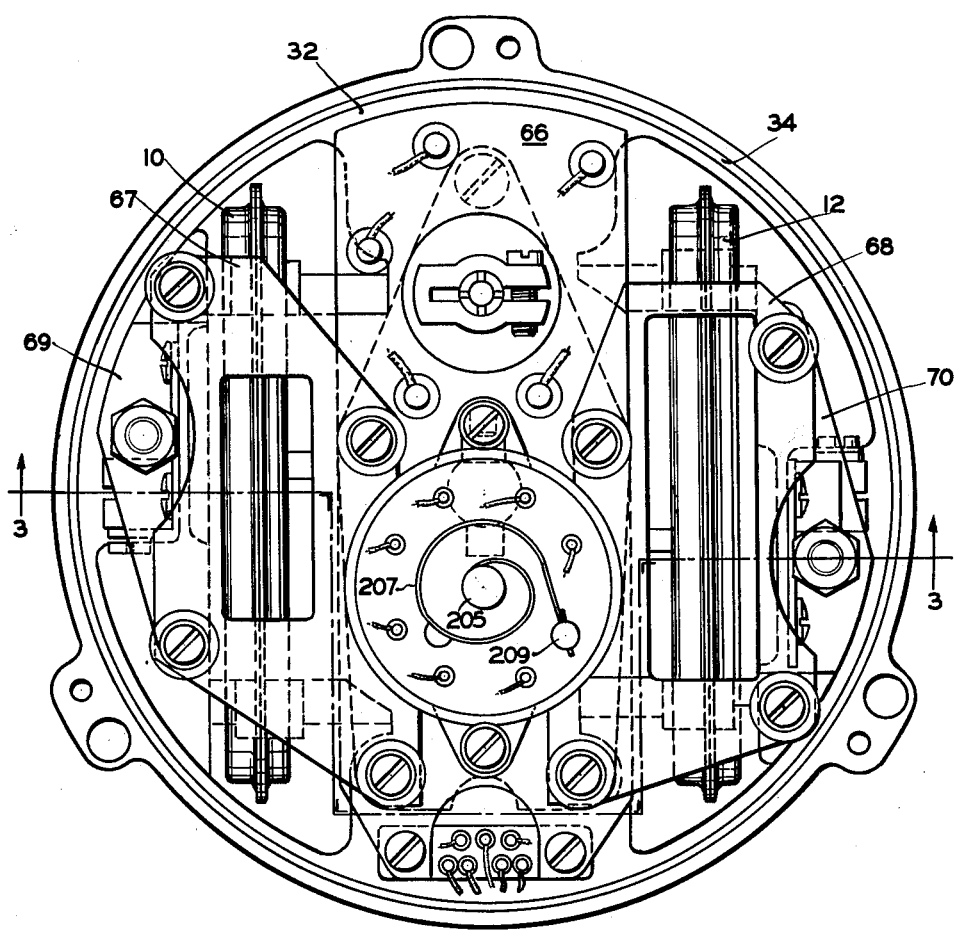
FIGURE 2 is a top plan view of the fluid pressure sensing mechanism with the top of the sealed fluid pressure chamber broken away to better illustrate the operating parts of the mechanism.

As shown in FIGURE 3, the air tight fluid pressure chamber 32 is defined by a casing element 34 mounted in sealing relation with a mounting plate 36 and in cooperative relation with a sealing ring 38 which may be formed of rubber or other suitable plastic material. An annular mounting flange 40 fits about the casing 34 and cooperates with a lip portion 42 of the casing 34 so as to fasten the same to the mounting plate 36. The mounting flange 40 is secured to the mounting plate 36 by suitable fastening bolts 44, as best shown in FIGURES 2 and 4. The fluid pressure conduit 33 projects into the chamber 32 through a plate 46 secured to the mounting plate 36 by suitable bolts 48, as shown in FIGURE 3, and is mounted in sealing relation to the mounting plate 36 by a suitable sealing ring 50 formed of rubber or other suitable plastic material. Also projecting through the plate 46 are suitable insulated electrical connectors 52 for making the necessary electrical connections to the operating parts of the mechanism mounted within the casing 34, as shown diagrammatically in FIGURE 1.

As shown in FIGURE 4, there is secured to the mounting plate 36 by a fastening screw 54 and nut 56 a main supporting plate 58 carrying supporting posts 60 and 62 for an auxiliary supporting plate 64 which in turn has secured thereto supporting posts 65 carrying at the opposite end thereof an additional auxiliary supporting plate 66. Bolted to the auxiliary supporting plate 66 are top supporting plates 67 and 68 in turn supported at opposite outer ends by bifurcated supporting members 69 and 70 fastened by bolts 71 to the main supporting plate 58, as shown by FIGURES 3 and 6.

Projecting axially from the nut 56 is a stub shaft 72 carrying at the free end thereof a jeweled bearing 73 in which is rotatably mounted one end of the rocking shaft 18. The opposite end of the rocking shaft 18 is mounted in a second jeweled bearing 76 carried by a supporting member 78 mounted in the auxiliary supporting plate 64. Projecting radially from the rocking shaft 18 are operating arms 80 and 81 to which there are connected through bimetal elements 82 and 83 and pivot pins 84 and 85 the ends of linkage members 14 and 16. The other ends of the linkage members 14 and 15 are connected respectively to the free ends of the diaphragm capsules 10 and 12 by pivot pins 86 and 87, as best shown FIGURE 3.

Further, projecting from the other ends of the diaphragm capsules 10 and 12 are supporting posts 88 and 90, respectively, secured by clamping brackets 92 and 94 to leaf spring members 96 and 98. The lower ends of the leaf spring members 96 and 98 are in turn secured by bolts 100 and 102 to opposite sides of the main supporting plate 58, as shown in FIGURE 3.

The brackets 92 and 94 are further provided with actuating elements 104 and 106 respectively, arranged in cooperative relation with temperature responsive bimetal post elements 107 and 108 which are secured at the upper ends of the bifurcated supporting members 69 and 70 in spanning portions 109 and 110 while the lower ends of the bimetal post elements 107 and 108 extend pendulously in longitudinal slots provided in the bifurcated members 69 and 70.

The bimetal post elements 107 and 108 are arranged to flex at the lower ends thereof with changes in ambient temperature so as to cooperate with the respective actuating elements 104 and 106 biased into contacting relation therewith by the leaf springs 96 and 98. As shown in FIGURE 3, the bimetal post element 107 is so arranged as to flex in a counterclockwise direction while the post element 108 flexes in a clockwise direction at the lower ends thereof upon an increase in the ambient temperature to compensate for a change in modulus of elasticity of the metallic parts of the diaphragm capsules while upon a decrease in the ambient temperature an opposite compensation is effected by a clockwise deflection of the the post element 107 and a counterclockwise deflection of the post element 108 to correct for a counter-change of the diaphragm capsules in response to the decrease in the ambient temperature.

Thus upon a change in the ambient temperature, the bimetal post elements 107 and 108 in effect cause a repositioning of the respective diaphragm capsules 10 and 12 through the supporting posts 88 and 90 and brackets 92 and 94 secured at the upper ends of the leaf springs 96 and 98 so as to change the operating position of the diaphragm capsules 10 and 12 with a change in the effective ambient temperature.

Such repositioning of the diaphragm capsules 10 and 12 in response to changes in the ambient temperature effect a corrective adjustment to the diaphragm capsules 10 and 12 compensating for the effects of such changes in temperature on the operative structure thereof.

Furthermore, the bimetal elements 82 and 83 between the operating linkages 14 and 16 and the connecting arms 80 and 81 respectively, cause in response to changes in the ambient temperature a corrective compensating adjustment effective to vary the operating range of the cooperating parts connecting the diaphragm capsules 10 and 12 to the differential transformer 30.

The bimetal elements 82 and 83 may include an outer member of flexible steel or invar and an inner member of copper having a greater temperature coefficient of expansion than the outer member and so arranged that the bimetal elements deflect in an outward sense upon an increase in temperature, as indicated by the arrow in FIGURE 5, and in an inward sense upon a decrease in the ambient temperature. Thus upon an increase in the ambient temperature the bimetal elements 82 and 83 flex in an outward sense causing in turn an increase in the effective length of the arms 80 and 81 connecting the linkage 14 and 16 to the rocking shaft 18 while upon a decrease in the ambient temperature the bimetal elements 82 and 83 flex in an inward sense causing in turn a decrease in the effective length of the arms 80 and 81 so as to provide the necessary correction in the operating range.

The rocking shaft 18 mounted at the opposite ends thereof in the jeweled bearings 73 and 76, as shown in FIGURE 4, is angularly positioned by the operation of the diaphragm capsules 10 and 12 in response to changes in the pressure of the fluid medium applied in the chamber 32 and acting thereon. Such angular movement of the rocking shaft 18 is in turn transmitted by a gear 120 to a second gear 122 in toothed engagement therewith and carried by a shaft 124 having the opposite ends thereof supported in jeweled bearings 126 and 128. The jeweled bearing 126 is carried by an arm 130 secured to the auxiliary plate 64 by a bolt 132 while the jeweled bearing 128 is supported by a member 134 projecting interiorly across an upper casing 136 of an epicyclic differential gear assembly, indicated generally by the numeral 26.

The epicyclic differential gear assembly 26 includes in addition to the upper casing 136 a lower casing 138 fastened thereto by suitable bolts. The upper casing 136 has an axially extending tubular flange portion 142 rotatably mounted in bearings 144 carried by the auxiliary mounting plate 66 while the lower casing 138 has an axially extending tubular flange portion 146 rotatably mounted in bearings 148 carried by the auxiliary supporting plate 64.

As shown diagrammatically in FIGURE 1 and structurally in FIGURE 4, the shaft 124 extends through the tubular flange portion 146 into the epicyclic gear assembly 26 and has mounted at the upper end thereof a sun gear 150 drivingly engaging a planetary gear 152 carried by a shaft 154. The lower end of the shaft 154 is rotatably mounted in a jeweled bearing 156 carried by the lower casing 138 while the upper end of the shaft 154 is rotatably mounted in a jeweled bearing 158 carried by the upper casing member 136. At the upper end of the shaft 154 is provided a second planetary gear 160 drivingly engaging a sun gear 162 mounted on a shaft 164 extending through the tubular flange portion 142 of the upper casing 136. The shaft 164 is rotatably mounted at the lower end thereof in the jeweled bearing 128 carried by the member 134 while the upper end of the shaft 164 is rotatably mounted in a jeweled bearing 166 carried by a top plate 168 of a differential transformer housing 170. A counter weight 171 is fastened between the upper casing 136 and lower casing 138 and so arranged as to statically balance the shaft 154 and planetary gears 152 and 160 rotatably carried between the upper casing 136 and lower casing 138.

The transformer housing 170 is fastened to the auxiliary supporting plate 66 in a predetermined adjusted position by clamping plates 172 secured thereto by bolts 173. Fixedly mounted within the housing 170 of the differential transformer 30 are primary coils 175 and secondary coils 177, as shown schematically in FIGURE 1. The primary coils 175 are electrically energized from the source of alternating current by way of a pair of conductors 179. The degree of inductive coupling between the primary coils 175 and the secondary coils 177 is governed by the movable core 28 mechanically connected to the shaft 164 which is in turn actuated through the differential gear assembly 26 by the diaphragm capsules 10 and 12 subject to the fluid pressure conditions prevailing in the chamber 32 and operatively applied through the fluid pressure conduit 33. Thus, the diaphragm capsules 10 and 12 are operatively connected to the rotor core 28 so as to position the same relative to the primary and secondary coils 175 and 177. The top plate 168 is cemented to the winding 175 while the housing 170 is cemented to the winding 177 and the windings are in turn cemented together so that the top plate 168, housing 170 and windings 175 and 177 provide a unitary structure.

The housing 170 and thereby the primary and secondary coils are initially positioned by the operator to a null position relative to the rotor core 28 upon the output shaft of the servo motor 191 being in an adjusted position corresponding to the prevailing fluid pressure applied in the chamber 32. When the fluid pressure applied in the chamber 32 increases or decreases from said pressure condition, the rotor core 28 will be adjustably positioned by the diaphragm capsules 10 and 12 to one side or the other of the null position in response to the effective fluid pressure so as to cause a signal to be induced by the primary windings 175 into the secondary winding 177 of an electrical phase dependent upon whether there be an increase or decrease in the sensed pressure relative to the null position.

The signal induced in the secondary winding 177 will then be applied to output conductors 181 leading through an output winding 183 of an anti-hunting generator 185 to the input of an amplifier 187. The output signal will then be applied by the amplifier 187 to the control winding 189 of the two-phase servo motor 191 having a fixed phase winding 193. The two-phase motor 191 is of a conventional type and the arrangement is such that the control signal applied to the control winding 189 will be of an amplitude controlling the rate of rotation of the motor 191 and of a phase such as to control the direction of rotation of the motor 191. The motor 191 in response to the control signal will drive the rotor of the anti-hunting generator 185 in a direction and at a rate tending to apply across the output winding 183 an anti-hunting signal of a phase and magnitude tending to retard over adjustment of the motor 191. The anti-hunting generator 185 is of a conventional type and has an input winding 195 connected across the source of alternating current.

The motor 191 in response to the error signal applied across the control winding 189 drives the shaft 197 and in turn a follow-up shaft 199, as shown in FIGURE 1, and thereby a spur gear 201 in toothed engagement with a ring gear 203 formed integral with the outer circumferential surface of the upper casing 136 of the differential gear assembly 26 so as to drive therethrough the rotor core 28 so as to return the same to a null signal position relative to the primary and secondary coils 175 and 177 of the differential transformer 30. The shaft 197 may be operatively connected to a suitable altitude pressure indicator or computer mechanism.

Affixed to the outer end of the shaft 164 is a member 205 having fastened thereto one end of a hair spring 207 the opposite end of which is secured to a post 209 projecting from the top plate 168 of the housing 170. The hair spring 207 serves to apply a constant torque to the shaft 164 so as to maintain the teeth of the several gears 162 and 160, 152 and 150, and 122 and 120 in constant engaging relation to prevent back-lash or lost motion therebetween.

The follow-up shaft 199, as best shown in FIGURE 4, is rotatably mounted in the roller bearings 211 carried by the auxiliary plate 64 and in roller bearings 213 carried by a supporting member 215 affixed by a bolt 217 to the mounting plate 36. A coil spring 219 is mounted in the supporting member 215 and arranged to bias a collar 221 and a sealing ring 223 formed of a conventional rubber or suitable plastic material so as to seal the shaft 199 from the leakage of fluid pressure medium into or out of the chamber 32. The lower end of the shaft 199, as shown in FIGURE 4, is arranged to be driven by the output shaft 197 of the servo motor 191 while the upper end of the follow-up shaft 199 is fastened by a suitable clamp 225 to the gear 201 which may be of a conventional type having a double plate and spring biasing means so arranged as to prevent back-lash between the teeth of the gear 201 and the teeth of the ring gear 203 in toothed engagement therewith.

Further fastened to the follow-up shaft 199, as shown structurally in FIGURE 4 and schematically in FIGURE 1, is a gear 230 driving through an idler gear 232 a third gear 234 rotatably mounted on the stub shaft 72. The gear 234 has mounted thereon an insulation block 233 carrying suitable normally open switch elements shown schematically in FIGURE 1 and indicated by the numerals 235 and 236 and 237 and 238 controlled by an actuating element 240 of a suitable electrically non-conducting material mounted on the shaft 18. The switch elements 235 and 237 may be electrically connected by a conductor 242 to the input of amplifier 187 while the other input may be connected by a conductor 244 to a center tap 246 on secondary winding 248 of transformer 250 having a primary winding 252 connected across a suitable source of alternating current while opposite ends of secondary winding 248 may be connected by conductors 254 and 256 to the switch elements 236 and 238. The member 240 is arranged to selectively actuate the switch element 235 to close switch element 236 upon a predetermined arcuate movement of the rocking shaft 18 relative to the gear 234 in one sense as upon a relatively great increase in the effective fluid pressure acting upon the diaphragm capsules 10 and 12 while upon a predetermined arcuate movement of the rocking shaft 18 in an opposite sense as upon a relatively great decrease in the effective fluid pressure acting upon the diaphragm capsules 10 and 12 the member 240 actuates the switch element 237 to close switch element 238.

The arcuate movement of the rocking shaft 18 thereby causes selective closure of one or the other of the overcontrol switches by the actuating member 240 to cause a signal voltage to be applied to the input of the amplifier 187 and cause rotation of the motor 191 in one direction or the other depending upon the selective operation of the overcontrol switches and in a direction such as to cause rotation of the follow-up shaft 199 and thereby gears 230, 232 and 234 in a sense to cause the switch elements 235 or 237 to be driven out of contacting relation with the actuating member 240 and open the cooperating switch elements 236 or 238 as the case may be.

*Operation*

The aforenoted fluid pressure sensitive mechanism includes two diaphragm capsules 10 and 12, a rocking shaft 18, a differential gear assembly 26 and electrical pick-off device or differential transformer 30 operatively connected serially one to the other and mounted within an air tight chamber in which is applied the fluid pressure medium to which the diaphragm capsules are responsive.

The pressure sensitive diaphragm capsules 10 and 12 are symmetrically positioned so that a force applied to the free end of one of the diaphragm capsules in one sense due to changes in the attitude of the mechanism relative to the applied gravitational forces or to changes in the applied accelerational forces or to causes other than changes in the pressure of the fluid medium applied within the chamber 32 will be compensated by a like force applied in an opposite sense to the other of the diaphragm capsules so as to correct for the tendency of such forces to effect any linear motion at the free ends of the diaphragm capsules or impart any motion to the jewel mounted rocking shaft 18.

The arrangement is such, however, that a change in the pressure of the fluid medium applied within the chamber 32 will effect the diaphragm capsules 10 and 12 in a like sense tending to cause the same to expand upon a decrease in the pressure of the fluid medium and contract upon an increase in the pressure of the fluid medium so as to impart a motion to the free ends of the capsules 10 and 12 acting in cooperative relation in a like sense to actuate the jewel mounted rocking shaft 18 and differential gear assembly 26 operatively connecting the diaphragm capsules 10 and 12 to the rotor core 28 of the differential transformer 30.

This motion of the free ends of the diaphragm capsules 10 and 12 in response to changes in the effective fluid pressure medium is transmitted to the movable rotor core 28 of the electrical pick-off or differential transformer 30 through the jewel mounted gearing of the differential assembly 30 so as to cause a displacement of the rotor core 28 from its original null position to effect an electrical error signal across the output lines 181 which is of one phase upon an increase in the sensed pressure above the null value and of an opposite phase upon a decrease in the sensed pressure below the null value.

The error signal thus applied across the output lines 181 is in turn directed through a servo amplifier 187 so that the electrical error signal becomes sufficient in magnitude to energize the control winding 189 of a servo motor 191 to cause the servo motor 189 to drive through the shaft 197, follow-up shaft 199, gear 201 and ring gear 203 of the differential gearing 26 in a direction to return the rotor core 28 of the differential transformer 30 to its initial null position relative to the primary and secondary windings 175 and 177 of the differential transformer 30.

Thus, the output shaft 197 of the servo motor 191 will move as a function of the magnitude of the fluid pressure applied within the chamber 32.

The symmetry in the arrangement of the diaphragm capsules 10 and 12 about the movable rocking shaft 18 serves to immunize the position of the rotor core 28 from the effects of changes in the attitude and accelerational forces applied thereto. Any such environmental force effects upon one of the diaphragm capsules will produce equal and opposite effects upon the symmetrically located other capsule so that the resultant effect upon the rocking shaft 18 is negligible.

Moreover, as a result of temperature variations to which the component parts are subjected, accuracy considerations necessitate the use of temperature compensating adjustments in order to cancel calibration "shifts" which are caused by component dimensional changes. Certain of the compensations required may be attributed to changes occurring in the deflection characteristics of the diaphragm capsules 10 and 12 with changes in the ambient temperature while other compensations may be required due to shifts in the ranges of adjustment due to minute dimensional changes in the parts operatively connecting the diaphragm capsules 10 and 12 to the differential transformer 30.

Cancellation of these "shifts" is accomplished by adjustment of the bimetallic linkages 82 and 83 and the bimetallic rod elements 107 and 108 so as to effect the necessary corrective adjustment in the effective range of the operating linkage and in the start or mounted position of the respective diaphragm capsules 10 and 12 in response to changes in the ambient temperature.

Calibration of the pressure sensitive mechanism is achieved by adjustment of the connecting linkages and positioning of the diaphragm capsules relative to the jewel mounted rocking shaft 18 while initial calibration of the output shaft 197 of the servo motor 191 in relation to the pressure sensitive mechanism is achieved by the operator arcuately adjusting the housing 170 of the differential transformer 30 on the auxiliary mounting plate 66, so as to effect a null position of the rotor core 28 relative to the inductive windings 175 and 177 with the output shaft of the motor 191 at an operative position corresponding to that of the pressure applied within the chamber 32.

The set of overtravel switches 235–236 and 237–238 controlled by the arcuate displacement of the rocking shaft 18 relative to the follow-up shaft 199 provide control of the servo motor 191 for large displacements of the rocking shaft 18, as upon great changes in the effective fluid pressure which might otherwise cause a displacement of the rotor core 28 in excess of its normal operating range and effect a signal of an erroneous phase. The overtravel switches 235–236 and 237–238 are arranged so as to prevent such erroneous mode of operation of the servomotor 191 by providing a controlling signal of proper phase under such excessive fluid pressure change conditions.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a fluid pressure sensitive mechanism of a type including a rocking shaft, a pair of diaphragm capsules disposed at opposite sides of said shaft, means operatively connecting said capsules to the shaft for imparting angular movement to said shaft in response to changes in the fluid pressure applied to said capsules; the improvement comprising temperature responsive means for supporting said capsules in operative relation to said shaft and arranged to variably position said capsules relative to said shaft so as to compensate for changes in the modulus of elasticity of the diaphragm capsules caused by variations in ambient temperature; and said connecting means including temperature responsive means for varying the operating range of said connecting means with changes in said ambient temperature so as to compensate for changes in operating characteristics of the fluid pressure sensitive mechanism effected by said changes in the ambient temperature.

2. In a fluid pressure sensitive mechanism of a type including a rocking shaft, a pair of diaphragm capsules disposed at opposite sides of said shaft, means operatively connecting said capsules to the shaft for imparting angular movement to said shaft in response to changes in the fluid pressure applied to said capsules; the improvement comprising a first pendulous bimetal post for supporting one of said diaphragm capsules and effective to flex in response to changes in ambient temperature, a second pendulous bimetal post for supporting the other of said diaphragm capsules and effective to flex in response to said changes in ambient temperature, and said first and second bimetal posts being so arranged as to flex in opposite senses in response to said changes in ambient temperature so as to vary the position of said diaphragm capsules relative to the shaft to compensate for variations in the modulus of elasticity of said capsules caused by said changes in the ambient temperature.

3. In a fluid pressure sensitive mechanism of a type including a rocking shaft, a pair of diaphragm capsules disposed at opposite sides of said shaft, means operatively connecting said capsules to the shaft for imparting angular movement to said shaft in response to changes in the fluid pressure applied to said capsules; the improvement comprising a first pendulous bimetal post for supporting one of said diaphragm capsules and effective to flex in response to changes in ambient temperature, a second pendulous bimetal post for supporting the other of said diaphragm capsules and effective to flex in response to said changes in ambient temperature, said first and second bimetal posts being so arranged as to flex in opposite senses in response to said changes in ambient temperature so as to vary the position of said diaphragm capsules relative to the shaft to compensate for variations in the modulus of elasticity of said capsules caused by said changes in the ambient temperature, said connecting means including bimetallic members responsive to changes in said ambient temperature for varying the operating range of said connecting means with changes in said ambient temperature so as to compensate for changes in operating characteristics of the fluid pressure sensitive mechanism effected by said changes in the ambient temperature.

4. In a fluid pressure sensitive mechanism of a type including a rocking shaft, a diaphragm capsule disposed at one side of the rocking shaft, an operating arm projecting radially from the rocking shaft, and linkage means operatively connecting said diaphragm capsule to said arm for imparting angular movement to said shaft in response to changes in the fluid pressure applied to said capsule; the improvement comprising a bimetallic member mounted on said arm and effective to flex in response to changes in ambient temperature in a sense to vary the effective length of said operating arm and thereby the operating range of said linkage means with changes in said ambient temperature so as to compensate for changes in operating characteristics of the fluid pressure sensitive mechanism effected by said changes in the ambient temperature.

5. In a fluid pressure sensitive mechanism of a type including a rocking shaft, a diaphragm capsule disposed at one side of the rocking shaft, an operating arm projecting radially from the rocking shaft, and linkage means operatively connecting said diaphragm capsule to said arm for imparting angular movement to said shaft in response to changes in the fluid pressure applied to said capsule; the improvement comprising a bimetallic member mounted on said arm and effective to flex in response to changes in ambient temperature in a sense to vary the effective length of said operating arm and thereby the operating range of said linkage means with changes in said ambient temperature, a pendulous bimetallic post for supporting the diaphragm capsule, said post being effective to flex in response to changes in ambient temperature so as to vary the position of said capsule relative to the shaft and thereby compensate for variations in the modulous of elasticity of said capsule caused by said changes in the ambient temperature, and a leaf spring for opposing the flexure of said pendulous bimetallic post from an initial position in response to changes in the ambient temperature from a value corresponding to that under which said initial position of the bimetallic post may be effected, said bimetallic member and post cooperating so as to compensate for changes in operating characteristics of the fluid pressure sensitive mechanism effected by said changes in the ambient temperature.

6. In a fluid pressure sensitive mechanism of a type including a rocking shaft, a diaphragm capsule disposed at one side of the rocking shaft, and means operatively connecting said diaphragm capsule to said shaft for imparting angular movement to said shaft in response to changes in the fluid pressure applied to said capsule; the improvement comprising a pendulous bimetallic post for supporting the diaphragm capsule, said post being effective to flex in response to changes in ambient temperature so as to vary the position of said capsule relative to the shaft and thereby compensate for variations in the modulus of elasticity of said capsule caused by said change in the ambient temperature, and a leaf spring for opposing the flexure of said pendulous bimetallic post from an initial position in response to changes in the ambient temperature from a value corresponding to that under which said initial position of the bimetallic post may be effected.

7. In a fluid pressure sensitive mechanism of a type including a rocking shaft, a pair of diaphragm capsules disposed at opposite sides of said shaft, a pair of operating arms projecting radially from the rocking shaft, and linkage means operatively connecting one of said diaphragm capsules to one of said arms and the other of said diaphragm capsules to the other of said arms for imparting angular movement to said shaft in response to changes in the fluid pressure applied to said capsules; the improvement comprising a bimetallic member mounted on each of said arms and effective to flex in response to changes in ambient temperature in a sense to vary the effective length of said operating arms and thereby the operating range of said linkage means with changes in said ambient temperature, a first pendulous bimetallic post for supporting one of the diaphragm capsules, a second pendulous bimetallic post for supporting the other of the diaphragm capsules, said posts being effective to flex in response to changes in ambient temperature so as to vary the position of said capsules relative to the shaft and thereby compensate for variations in the modulus of elasticity of said capsules caused by said changes in the ambient temperature, leaf spring means for biasing the pendulous bimetallic posts toward an initial position relative to said shaft, and said bimetallic members and bimetallic posts cooperating so as to compensate for changes in operating characteristics of the fluid pressure sensitive mechanism effected by said changes in the ambient temperature.

8. In a fluid pressure sensitive mechanism of a type including a rocking shaft, a pair of diaphragm capsules disposed at opposite sides of said shaft, a pair of operating arms projecting radially from the rocking shaft, and linkage means operatively connecting one of said diaphragm capsules to one of said arms and the other of said diaphragm capsules to the other of said arms for imparting angular movement to said shaft in response to changes in the fluid pressure applied to said capsules; the improvement comprising a bimetallic member mounted on each of said arms and effective to flex in response to changes in ambient temperature in a sense to vary the effective length of said operating arms and thereby the operating range of said linkage means with changes in said ambient temperature, a first pendulous bimetallic post for supporting one of the diaphragm capsules, a second pendulous bimetallic post for supporting the other of the diaphragm capsules, said posts being effective to flex in response to changes in ambient temperature so as to vary the position of said capsules relative to the shaft and thereby compensate for variations in the modulus of elasticity of said capsules caused by said changes in the ambient temperature, leaf spring means for biasing the pendulous bimetallic posts toward an initial position relative to said shaft, jewel bearing means for supporting the opposite ends of said rocking shaft, an epicyclic differential gearing mechanism including a casing rotatably mounted and having a ring gear affixed thereto, a pair of sun gears, jewel bearing means rotatably mounting the sun gears in the casing, a pair of planetary gears, jewel bearing means rotatably mounting the planetary gears in the casing, said planetary gears being arranged in driving relation between the sun gears, an electrical pick-off device having a control element angularly movable from a predetermined null signal position, gear means for drivingly connecting the rocking shaft to one of the sun gears, means drivingly connecting the other sun gear to the control element of the electrical pick-off device to angularly move the control element from the null signal position to effect an output signal for controlling speed and direction of rotation of a variable speed reversible motor means, a follow-up shaft to be driven by the reversible motor means and including gear means for drivingly connecting the follow-up shaft to the ring gear of the epicyclic differential gearing mechanism so that the motor means may effectively drive the control element through the epicyclic differential gearing mechanism so as to angularly reposition the control element to the null signal position relative to the electrical pick-off device.

9. In a fluid pressure sensitive mechanism of a type including a rocking shaft, a pair of diaphragm capsules disposed at opposite sides of said shaft, a pair of operating arms projecting radially from the rocking shaft, and linkage means operatively connecting one of said diaphragm capsules to one of said arms and the other of said diaphragm capsules to the other of said arms for imparting angular movement to said shaft in response to changes in the fluid pressure applied to said capsules; the improvement comprising a bimetallic member mounted on each of said arms and effective to flex in response to changes in ambient temperature in a sense to vary the effective length of said operating arms and thereby the operating range of said linkage means with changes in said ambient temperature, a first pendulous bimetallic post for supporting one of the diaphragm capsules, a second pendulous bimetallic post for supporting the other of the diaphragm capsules, said posts being effective to flex in response to changes in ambient temperature so as to vary the position of said capsules relative to the shaft and thereby compensate for variations in the modulus of elasticity of said capsules caused by said changes in the ambient temperature, leaf spring means for biasing the pendulous bimetallic posts toward an initial position relative to said shaft, jewel bearing means for supporting the opposite ends of said rocking shaft, an epicyclic differential gearing mechanism including a casing rotatably mounted and having a ring gear affixed thereto, a pair of sun gears, jewel bearing means rotatably mounting the sun gears in the casing, a pair of planetary gears, jewel bearing means rotatably mounting the planetary gears in the casing, said planetary gears being arranged in driving relation between the sun gears, an electrical pick-off device having a control element angularly movable from a predetermined null signal position, gear means for drivingly connecting the rocking shaft to one of the sun gears, means drivingly connecting the other sun gear to the control element of the electrical pick-off device to angularly move the control element from the null signal position to effect an output signal for controlling speed and direction of rotation of a variable speed reversible motor means, a follow-up shaft to be driven by the reversible motor means and including gear means for drivingly connecting the follow-up shaft to the ring gear of the epicyclic differential gearing mechanism so that the motor means may effectively drive the control element through the epicyclic differential gearing mechanism so as to angularly reposition the control element to the null signal position relative to the electrical pick-off device, switch means for taking over control of said reversible motor means from said electrical pick-off device, actuating means for selectively engaging said switch means so as to prevent erroneous operation of the reversible motor means by said electrical pick-off device, said actuating means operatively positioned relative to said switch means by said rocking shaft, means for rotatably supporting said switch means relative to said actuating means, and gear means drivingly connecting said follow-up shaft to said supporting means so that said reversible motor means may reposition said switch means out of engaging relation with said actuating means in response to the overcontrol operation of said reversible motor means.

10. In a fluid pressure sensitive mechanism of a type including a rocking shaft, a pair of diaphragm capsules disposed at opposite sides of said shaft, and means operatively connecting said diaphragm capsules to said rocking shaft for imparting angular movement to said shaft in response to changes in the fluid pressure applied to said capsules; the improvement comprising jewel bearing means for supporting the opposite ends of said rocking shaft, an epicyclic differential gearing mechanism including a casing rotatably mounted and having a ring gear affixed thereto, a pair of sun gears, jewel bearing means rotatably mounting the sun gears in the casing, a pair of planetary gears, jewel bearing means rotatably mounting the planetary gears in the casing, said planetary gears being arranged in driving relation between the sun gears, an electrical pick-off device having a control element angularly movable from a predetermined null signal position, gear means for drivingly connecting the rocking shaft to one of the sun gears, means drivingly connecting the other sun gear to the control element of the electrical pick-off device to angularly move the control element from the null signal position to effect an output signal for controlling speed and direction of rotation of a variable speed reversible motor means, a follow-up shaft to be driven by the reversible motor means and including gear means for drivingly connecting the follow-up shaft to the ring gear of the epicyclic differential gearing mechanism so that the motor means may effectively drive the control element through the epicyclic differential gearing mechanism so as to angularly reposition the control element to the null signal position relative to the electrical pick-off device.

11. In a fluid pressure sensitive mechanism of a type including a rocking shaft, a pair of diaphragm capsules disposed at opposite sides of said shaft, and means operatively connecting said diaphragm capsules to said rocking shaft for imparting angular movement to said shaft in response to changes in the fluid pressure applied to said capsules; the improvement comprising jewel bearing means for supporting the opposite ends of said rocking shaft, an epicyclic differential gearing mechanism including a casing rotatably mounted and having a ring gear affixed thereto, a pair of sun gears, jewel bearing means rotatably mounting the sun gears in the casing, a pair of planetary gears, jewel bearing means rotatably mounting the planetary gears in the casing, said planetary gears being arranged in driving relation between the sun gears, an electrical pick-off device having a control element angularly movable from a predetermined null signal position, gear means for drivingly connecting the rocking shaft to one of the sun gears, means drivingly connecting the other sun gear to the control element of the electrical pick-off device to angularly move the control element from the null signal position to effect an output signal for controlling speed and direction of rotation of a variable speed reversible motor means, a follow-up shaft to be driven by the reversible motor means and including gear means for drivingly connecting the follow-up shaft to the ring gear of the epicyclic differential gearing mechanism so that the motor means may effectively drive the control element through the epicyclic differential gearing mechanism so as to angularly reposition the control element to the null signal position relative to the electrical pick-off device, switch means for taking over control of said reversible motor means from said electrical pick-off device, actuating means for selectively engaging said switch means as as to prevent erroneous operation of the reversible motor means by said electrical pick-off device, said actuating means operatively positioned relative to said switch means by said rocking shaft, means for rotatably supporting said switch means relative to said actuating means, and gear means drivingly connecting said follow-up shaft to said supporting means so that said reversible motor means may reposition said switch means out of engaging relation with said actuating means in response to the overcontrol operation of said reversible motor means.

12. In a fluid pressure sensitive mechanism of a type including a rocking shaft, a pair of diaphragm capsules disposed at opposite sides of said shaft, and means operatively connecting said diaphragm capsules to said rocking shaft for imparting angular movement to said shaft in response to changes in the fluid pressure applied to said capsules; the improvement comprising an electrical pick-off device having a control element angularly movable from a predetermined null signal position, differential means drivingly connecting the rocking shaft to the control element of the electrical pick-off device to angularly move the control element from the null signal position to effect an output signal for controlling speed and direction of rotation of a variable speed reversible motor means, a follow-up shaft to be driven by the reversible motor means, means drivingly connecting the follow-up shaft to the differential means so that the motor means may effectively drive the control element through the differential means so as to angularly reposition the control element to the null signal position relative to the electrical pick-off device.

13. In a fluid pressure sensitive mechanism of a type including a rocking shaft, a pair of diaphragm capsules disposed at opposite sides of said shaft, and means operatively connecting said diaphragm capsules to said rocking shaft for imparting angular movement to said shaft in response to changes in the fluid pressure applied to said capsules; the improvement comprising an electrical pick-off device having a control element angularly movable from a predetermined null signal position, differential means drivingly connecting the rocking shaft to the control element of the electrical pick-off device to angularly move the control element from the null signal position to effect an output signal for controlling speed and direction of rotation of a variable speed reversible motor means, a follow-up shaft to be driven by the reversible motor means, means drivingly connecting the follow-up shaft to the differential means so that the motor means may effectively drive the control element through the differential means so as to angularly reposition the control element to the null signal position relative to the electrical pick-off device, switch means for taking over control of said reversible motor means from said electrical pick-off device, actuating means for selectively engaging said switch means so as to prevent erroneous operation of the reversible motor means by said electrical pick-off device, said actuating means operatively positioned relative to said switch means by said rocking shaft, means for rotatably supporting said switch means relative to said actuating means, and means drivingly connecting said follow-up shaft to said supporting means so that said reversible motor means may reposition said switch means out of engaging relation with said actuating means in response to the overcontrol operation of said reversible motor means.

14. In a mechanism of a type including a rocking shaft, fluid pressure responsive means, means operatively connecting said fluid pressure responsive means to said rocking shaft for imparting angular movement to said shaft in response to changes in the fluid pressure applied thereto, and electrical control means operatively positioned by said rocking shaft for effecting an output signal for controlling a reversible motor means; the improvement comprising a follow-up shaft to be driven by the reversible motor means so as to actuate the electrical control means to a null signal position, switch means for taking over control of said reversible motor means from said electrical control means, actuating means for selectively engaging said switch means so as to prevent erroneous operation of the reversible motor means by said electrical control means, said actuating means operatively positioned relative to said switch means by said rocking shaft, means for rotatably supporting said switch means relative to said actuating means, and means drivingly connecting said follow-up shaft to said supporting means so that said reversible motor means may reposition said switch means out of engaging relation with said actuating means in response to the overcontrol operation of said reversible motor means.

15. In a mechanism of a type including a rocking shaft, fluid pressure responsive means, means operatively connecting said fluid pressure responsive means to said rocking shaft for imparting angular movement to said shaft in response to changes in the fluid pressure applied thereto, and electrical control means operatively positioned by said rocking shaft for effecting an output signal for controlling a reversible motor means; the improvement comprising a follow-up shaft to be driven by the reversible motor means so as to actuate the electrical control means to a null signal position, and another electrical control means operative jointly by relative angular movement of said rocking shaft and follow-up shaft to effect selective operation of said reversible motor means independently of the first-mentioned electrical control means.

16. In a fluid pressure sensitive mechanism of a type including a rocking shaft, a pair of diaphragm capsules disposed at opposite sides of said shaft, means operatively connecting said capsules to the shaft for imparting angular movement to said shaft in response to changes in a fluid pressure applied to said capsules; the improvement comprising a base plate carrying jewel bearing means for supporting opposite ends of said rocking shaft, a pair of bifurcated supporting members affixed to said base plate at opposite sides of said shaft, a first pendulous bimetal post having a portion thereof affixed in one of said supporting members and another portion of said first post extending into a space between the bifurcated portions of said one supporting member, said other portion of said first post supporting one of said diaphragm capsules and being arranged to flex in response to changes in ambient temperature, a second pendulous bimetal post having a portion thereof affixed in the other of said supporting members and another portion of said second post extending into a space between the bifurcated portions of said other supporting member, said other portion of said second post supporting the other of said diaphragm capsules and being arranged to flex in response to changes in ambient temperature, said first and second bimetal posts being so arranged as to flex in opposite senses in response to said changes in ambient temperature so as to vary the position of said diaphragm capsules relative to the shaft so as to compensate for variations in the modulus of elasticity of said capsules caused by said changes in the ambient temperature, a casing mounted on said base plate and enclosing the structure of the pressure sensitive mechanism within a chamber provided thereby, a conduit for supplying to the chamber enclosed by said casing the fluid pressure applied to said capsules, an electrical signal control device carried by said casing, and means operatively connecting said rocking shaft to said electrical signal control device.

17. The combination defined by claim 16 including an epicyclic differential gearing mechanism for operatively connecting said rocking shaft to said electrical signal control device, said mechanism including another casing rotatably mounted and having a ring gear affixed thereto, a pair of sun gears, jewel bearing means for rotatably mounting the sun gears in said other casing, a pair of planetary gears, jewel bearing means for rotatably mounting the planetary gears in said other casing, said planetary gears being arranged in driving relation between the sun gears, gear means for drivingly connecting the rocking shaft to one of the sun gears, and means for drivingly connecting the other sun gear to the electrical signal control device so as to selectively actuate the control device from a null signal position to an output signal position for controlling speed and direction of rotation of a variable speed reversible motor means; a follow-up shaft projecting through said base plate into the fluid pressure chamber and arranged so as to be driven by said reversible motor means, said follow-up shaft including gear means for drivingly connecting the follow-up shaft to the ring gear of the epicycle differential gearing mechanism so that the motor means may effectively actuate the electrical signal control device from an output signal position to the null signal position; and auxiliary means for taking over control of said reversible motor means from said electrical signal control device under extreme operating conditions, said auxiliary means including switch means for controlling said reversible motor means, actuating means for selectively engaging said switch means so as to prevent erroneous operation of said reversible motor means by said electrical signal control device under said extreme operating conditions, said actuating means operatively positioned relative to said switch means by said rocking shaft, means for rotatably supporting said switch means relative to said actuating means, and gear means drivingly connecting said follow-up shaft to said supporting means so that said reversible motor means may reposition said switch means out of engaging relation with said actuating means in response to the overcontrol operation of said reversible motor means.

References Cited in the file of this patent

UNITED STATES PATENTS

| | | |
|---|---|---|
| 2,165,744 | Boettinger | July 11, 1939 |
| 2,517,556 | Goertz | Aug. 8, 1950 |
| 2,601,777 | Woodward | July 1, 1952 |
| 3,017,619 | Andreson | Jan. 16, 1962 |
| 3,040,569 | Gray | June 26, 1962 |
| 3,040,582 | Lorenz | June 26, 1962 |
| 3,075,389 | Lear | Jan. 29, 1963 |